United States Patent Office 3,131,088
Patented Apr. 28, 1964

3,131,088
PROCESS OF PRODUCING SURFACE COATINGS
Werner Festag, Essen, Germany, assignor to
Th. A.-G. Goldschmidt, Essen, Germany
No Drawing. Filed Oct. 23, 1961, Ser. No. 147,073
Claims priority, application Germany Oct. 26, 1960
1 Claim. (Cl. 117—161)

This invention generally relates to decorative surface coatings and is particularly directed to a process for preparing diallyl phthalate-coated or impregnated carriers or films suitable for improving the surface characteristics of base materials.

The terms "carrier" or "base material" as used in this application including the appended claims are deemed to connote any suitable material in web, sheet, panel or block form to which a decorative surface coating can be applied such as, for example, paper, cardboard, wood, metal, glass, asbestos, concrete, synthetics, etc.

Considered from one aspect, the invention is concerned with a process for the production of laminar products of films suitable for improving the surface qualities of base materials and/or for lamination purposes, by first applying to a carrier, such as paper, liquid preparations containing partially polymerized, curable diallyl phthalate and subsequently removing the liquid medium. The film or laminar product thus produced may then be bonded to a base material, e.g. under pressure and heat, whereafter the diallyl phthalate is cured. Considered from another aspect, the invention provides for a process for preparing partially or pre-polymerized liquid diallyl phthalate preparations suitable as raw material for improving the surface characteristics of base materials and carriers.

The terms "partially polymerized," "partially polymerized curable" and "pre-polymerized" diallyl phthalate as used in this application including the appended claim are deemed to refer to diallyl phthalate which has been polymerized to a predetermined degree or intermediary polymerization stage at which the diallyl phthalate is still curable, whereafter the polymerization has been intentionally interrupted, e.g. by cooling.

For the purpose of obtaining films or coated webs which are suitable for improving the surface characteristics of a base material or which are used for lamination purposes, it has previously been suggested to impregnate a paper or the like web with partially polymerized, still curable diallyl phthalate. After the impregnation of the web, the polymerization is continued to a more advanced stage, wherein the diallyl phthalate assumes a substantially non-tacky gel-like condition. In this condition, the impregnated web is suitable to be applied to the base material, the surface qualities of which are to be improved. This is effected by simply pressing the film against the base, preferably in the presence of heat. According to the known processes for impregnating the paper or web referred to, the web is passed through a solution of partially polymerized diallyl phthalate dissolved in organic solvents such as, for example, acetone. In some instances, this solution of the partially polymerized product is admixed with monomeric diallyl phthalate as such addition facilitates the cross-linking of the partially polymerized product during the subsequent curing. In the known processes for impregnating the web with the diallyl phthalate solution, suitable provisions are made for controlling the amount of solution to be applied to the web. Thus, dosage equipment in the form of doctor blades, squeezing rollers or the like to be used in conjunction with the travelling web may be provided to adjust the desired amount of diallyl phthalate solution to remain on the web. Further, in these prior art processes, the solvent, i.e. the acetone, is usually expelled after the impregnation by heating in a subsequent process step.

The prior art processes of this kind have, however, a number of disadvantages and drawbacks. Thus, it will be realized that with a view to keeping the loss of solvent to a minimum or at least within reasonable limits, it is necessary to combine the impregnating plant with a plant for the recovery of the solvent. In doing so, the entire drying plant has to be very carefully constructed with regard to safety measures in order to avoid explosions which, of course in turn requires considerable additional expenditure with respect to plant equipment.

Further, an additional difficulty is that the polymerization products of diallyl phthalate, during the evaporation of the organic solvent, form a tightly closed coherent surface layer locking the solvent within the structure of the polymerization product and thus considerably obstructing the escape of the solvent vapors. This non-porous surface layer causes considerable difficulty in the removal of organic solvents from diallyl phthalate polymerization products. For the purpose of overcoming the effects of this closed coherent top layer or surface skin, while at the same time expelling at least a major portion of the solvent within a reasonable drying period, it is necessary to increase the temperature within the drying zone to as high as 135° C., even if low-boiling and readily volatile solvents such as actone are used for dissolving the partially polymerized diallyl phthalate. However, the required high temperature referred to in turn causes an untimely cross-linking and curing of the partially polymerized product, particularly as the partially polymerized product is usually admixed with a polymerization initiator or accelerator. As previously explained, the final curing or hardening of the partially polymerized product should occur after the application to the base material only, and continued polymerization during the removal of the solvent might result in a fully polymerized or cured product which can no longer successfully be bonded to the base material in the manner previously explained. Thus, the further utilization of the impregnated web is usually contingent on the curability of the partially polymerized diallyl phthalate and continued polymerization taking place during the drying at the high temperature indicated seriously endangers the usefulness of the product for the intended purpose.

There is still another disadvantage in the employment of diallyl phthalate dissolved in organic solvents: The paper or the like web to be impregnated or coated is oftentimes dyed, printed or provided with some kind of decorative pattern or ornamentation. This ornamentation easily smudges during the impregnation and drying procedure. If the ornamentation contains certain pigments or dyestuffs, these dyestuffs tend to bleed, thus spoiling the desired effect.

A still more serious drawback of employing pre-polymerized diallyl phthalate in organic solvents resides in the fact that the viscosity rapidly increases with the concentration of the diallyl phthalate in the solvent. This is particularly so if more than about 50% of partially polymerized diallyl phthalate is dissolved in the solvent. For this reason, it is practically impossible to produce diallyl phthalate solutions in organic solvents of high concentration.

Accordingly, it is an object of this invention to overcome the disadvantages of the prior art processes referred to, by providing a process for impregnating or coating webs and the like carriers with partially polymerized diallyl phthalate in the absence of organic solvent.

It is also an object of this invention to provide an improved process for the production of films or laminar products coated or impregnated with diallyl phthalate polymerization products which are suitable for improving the surface characteristics of base materials.

Considered from another aspect, the invention has as its object to provide for a novel process for preparing aqueous preparations of partially polymerized diallyl phthalate which are suitable for use in preparing laminar products for improving the surface characteristics of base materials.

Briefly, and in accordance with this invention, aqueous preparations of partially polymerized diallyl phthalate are used for the intended purpose.

By employing the partially polymerized diallyl phthalate in an aqueous medium, all the disadvantages inherent in the employment of organic solvents are overcome and the impregnation of the webs and the subsequent drying may be effected without danger of explosion. Further, no recovery problem with regard to solvent exists, as the evaporating water may, of course, be discarded.

The drying of the webs impregnated with the aqueous pre-polymerization product may be accomplished in drying equipment of the kind presently used for the purpose of drying paper and the like webs coated or impregnated with aqueous solutions of phenol- or melamine resins.

A particular advantage in using aqueous preparations as compared with solutions in organic solvents resides in the fact that, surprisingly, the aqueous preparations can be dried on the web at lower temperatures and within shorter periods of time than solutions of pre-polymerized diallyl phthalate in organic solvents, e.g., acetone. The reason for this is that water, as contrasted to organic solvents, exerts no swelling action on the polymerization product.

Further, and very importantly so, aqueous preparations of the kind referred to remain thinly liquid up to concentrations of about 60% and only after the concentration exceeds 60% do they assume a paste-like consistency. By contrast, as will be recalled, the viscosity of solutions of the pre-polymerization product in organic solvents increases rapidly already at concentration values of 50%. In the event that it should be desired to operate with a higher viscosity of the aqueous preparation, even at lower concentrations, then of course, the desired viscosity can be readily attained and adjusted by adding to the aqueous preparation emulsifiers and/or thickening agents of suitable composition well known in the art.

The aqueous preparation may contain the curable pre-polymerization product of diallyl phthalate either alone or in the form of mixtures with monomeric diallyl phthalate. As previously mentioned, it is known in the art to add monomeric diallyl phthalate to partially polymerized diallyl phthalate as the monomeric compound facilitates the subsequent curing. This is so because it induces cross-linking of the partially polymerized product during the final curing. Further, the presence of the monomeric compound causes the polymerization product to flow more readily during the final curing under heat and pressure. In the event that mixtures of partially polymerized diallyl phthalate and the monomeric compound are to be used, the amount by weight of the monomeric compound should be preferably between 1 and 30%, calculated on the weight of the pre-polymerization product.

The partially polymerized diallyl phthalate or the mixture of partially polymerized product with monomeric diallyl phthalate, as the case may be, forms preferably the dispersed phase of the aqueous preparation. This dispersed phase may be present in either suspended or emulsified form, dependent on whether the dispersed phase is composed solely of pre-polymerized diallyl phthalate or of a mixture of such pre-polymerized diallyl phthalate with the monomeric compound. However, it should be emphasized that both kinds may co-exist next to each other.

The quantity of partially polymerized product or mixture of partially polymerized product with the monomeric compound in the dispersion may amount up to 80% calaculated on the weight of the dispersion. The preferred range, however, is 30 to 70%.

The inventive aqueous preparations of the partially polymerized diallyl phthalate may be obtained either by dispersing the previously partially polymerized product in water or by emulsion-polymerization of monomeric diallyl phthalate.

In accordance with a preferred mode of operation for preparing the aqueous preparations of this invention, a partially polymerized diallyl phthalate, if desired in mixture with monomeric diallyl phthalate, is first dissolved in an organic solvent which is immiscible with water. For this purpose, aromatic hydrocarbons such as, for example benzene or toluene are suitable. Thereafter, an emulsifier is added either to the solution of the partially polymerized product in the organic solvent or to the water which is necessary to form the desired dispersion. The amount of emulsifier may vary, but should preferably be within a range of 0.5 to 5%. A 10% addition of emulsifier also shows good results.

For the purpose of obtaining the emulsion, the solution of the partially polymerized product in the organic solvent is added to the water with strong agitation. However, it is also feasible to proceed in accordance with the so-called inversion method. According to this method, the receiving phase is the phase to be dispersed and the water is added in small portions until a water-in-oil emulsion has been formed. Upon adding a further amount of water, the inversion point is reached and the water-in-oil emulsion previously formed changes over at this point to form a thinly liquid emulsion of the oil-in-water type. The solvent is thereafter removed from the emulsion by distillation, if necessary under reduced pressure. The removal of the solvent by distillation may be effected either after the emulsion has been completed or continuously during the emulsifying procedure from that moiety of the system which is already in emulsified form. Upon removal of the solvent, a dispersion of very fine particles of the partially polymerized product or the partially polymerized product-monomer-mixture, respectively, is obtained.

In this manner, thinly liquid dispersions having a polymer content of, for example 20 to 30% can be easily obtained. By adding to these thinly liquid dispersions additional partially polymerized diallyl phthalate, aqueous preparations in paste form having a polymer content of up to 80% may be obtained. It is also feasible and within the scope of this invention to admix these dispersions with monomeric diallyl phthalate and/or other monomeric allyl and/or vinyl compounds without affecting the stability of the dispersions.

According to another preferred mode of operation for preparing the aqueous preparations of this invention, monomeric diallyl phthalate is used as starting material. This monomeric compound is emulsified in water and is polymerized in emulsified condition to form a partially polymerized curable product. For the purpose of accelerating the polymerization of the monomeric compound, polymerization initiators or accelerators may be used, as for example known radical forming agents such as benzoyl peroxide. The amount of such radical forming agent may be about 1 to 2% calculated on the monomeric compound.

With a view to avoiding untimely, undesired cross-linking of the partially polymerized product and its gel formation, chain transferring agents, such as for example carbon tetrachloride, may be added to the diallyl phthalate, either prior to or during the polymerization, in an amount of about 1 to 30%, calculated on the diallyl phtalate. Due to the chlorine content of the pre-polymerisates thus produced—which may for example amount to 5 to 8%—they are, upon curing, more stable and show less tendency to decompose than pre-polymerisates of diallyl phthalate which have been obtained by emulsion-polymerization and thereafter cured without the addition of carbon tetrachloride or the like chain transferring agent.

The polymerization of the monomeric compound is carried out at temperatures of about 60 to 120° C., preferably within a range of 80 to 100° C. until the desired polymer content of, for example 95% has been obtained. The ratio of water to monomeric ester may be chosen in such a manner that a dispersion having a solid content of up to about 70% and more are obtained.

The suspensions or emulsions, respectively, to be prepared and used in the inventive process may contain as emulsifiers surface active compounds of the most varying compositions. Particularly suitable for this purpose are high molecular, water soluble or water swellable emulsifiers. Such substances are, for example, polyacrylic acid and its derivatives (as, for example, polyacrylic amide), polyalkylene oxides (as, for example, polyhydroxyethylene ethers or polyhydroxyethylene), and polyhydroxypropylengraft - polymerisates. Further, water soluble and water swellable cellulose derivatives, for example carboxy methyl cellulose are suitable. Particularly stable suspensions or emulsions are obtained if polyvinyl alcohol or partially saponified polyvinyl acetates, if desired in mixtures with the previously mentioned or other surface active substances, are used.

For the purpose of facilitating the subsequent hardening under pressure and heat of the paper or web treated in accordance with this invention, the aqueous preparations may be admixed with polymerization inducers or catalysts known per se, in amounts of about 1 to 3%. Particularly suitable for this purpose are compounds which contain peroxide groups, such as benzoyl peroxide, butyl perbenzoate and the like. The addition of the polymerization inducing agent or catalyst advantageously is effected shortly before the application of the aqueous preparation onto the carrier or web.

The web-like carrier substances onto which the inventive aqueous preparations are to be applied may consist of water absorbing or non-absorbing materials. Fiber webs or fleeces of paper, cotton and/or certain synthetics may be mentioned as examples for absorbing materials while non-absorbing materials, for example, are metal, glass or wood. Dependent on the nature of the carrier and its structure, the aqueous preparation remains on the surface of the carrier as a continuous layer or coat or the aqueous preparation may additionally soak or penetrate into the interior of the carrier, particularly if the carrier consists of paper, cardboard or the like webs.

As previously mentioned, the aqueous preparations may be applied to the carrier materials by known processes and equipment. Thus, for example, the aqueous preparation may be applied by spraying, brushing, soaking or dipping the carrier into a bath filled with the aqueous preparation. According to a preferred embodiment, the web to be coated or impregnated, for example a paper web, is unwound from a supply roll and passes through a bath containing the aqueous preparation. For the purpose of controlling and adjusting the optimum amount of aqueous preparation to remain on the web, the web passes through a dosage arrangement such as a doctor blade assembly or between squeegeeing rollers and is then conveyed through one or several drying chambers whose temperature, dependent on the weight ratio between polymeric and monomeric diallyl phthalate, is maintained at between 80 to 110° C. The drying zone may be heated by hot air or by means of radiators emitting infrared rays. At the end of the drying zone, the treated web is then wound onto a receiving roller. Obviously, it is also possible to dip individual sheets into a bath and to dry them thereafter in a stationary heating device.

The carriers or webs to be coated may be colored and/or provided with any pattern or surface ornamentation. In this manner, the treated carrier web may be imparted with any desired decorative effect without requiring the addition of coloring matter to the aqueous preparation. Entirely transparent and clear or opaque and dyed surface layers may thus be obtained by merely employing webs having the desired surface characteristics.

In the event that the aqueous preparation of the curable pre-polymerized diallyl phthalate is to be applied to carrier material which does not absorb water, as for example metal, glass or wood, then the coated or treated carrier is first dried at temperatures of about between 100 to 110° C. whereafter subsequently the final curing is effected at preferably 140 to 160° C., if necessary with the application of pressure, e.g. of about 4 to 10 kg. per sq. cm. The carrier may be shaped at the same time. In this manner, smooth transparent resin coats are obtained which form a strong bond and adhere to the carrier material. They form a protective coat which is not attacked by water and/or organic solvents.

According to to a further embodiment of the invention, the aqueous preparation is admixed with a formaldehyde condensation resin which is dissolved in the aqueous phase of the preparation. If water obsorbing carriers of hydrophilic material which tends to swelling are used, as for example cellulose fibers, the addition of the condensation resin considerably reduces the swelling capacity of the carrier. Due to the pronounced affinity of formaldehyde condensation resins to the hydrophilic fiber, the latter is first coated with a protecting jacket or layer of condensation resin. This layer protects the carrier from attack by the peroxide which may have been added for the purpose of facilitating the final curing and further protects the fiber after completed curing from attack by moisture. The pre-polymerized diallyl phthalate lodges itself on and between the thus enveloped fibers.

The amount of formaldehyde condensation resin to be dissolved in the aqueous phase of the inventive aqueous preparations is chosen in such a manner that the reaction product, after removal of the liquid medium, contains about 2 to 50, preferably about 10 to 33% by weight of condensation resin, calculated on the weight of untreated water absorbing carrier.

For the purpose of preparing stable mixtures of water soluble formaldehyde condensation resin and aqueous preparations of curable pre-polymerized diallyl phthalate, it is important to use dispersions which are not affected by electrolyte additions so as to prevent coagulation during the soaking or impregnating procedure. For this reason, partially polymerized diallyl phthalate-containing aqueous preparations are particularly suitable which have been dispersed with polyhydroxyalkylenes, polyvinyl alcohol or polyacrylic acids. In the preparation of these mixtures, care should also be taken that the formaldehyde condensation resin does not precipitate upon introduction into the aqueous dispersion. For the purpose of preventing such precipitation, amino resins (amino plast resins) having a low condensation degree are used. It is also within the scope of this invention to employ resins which have been modified by etherification with aliphatic, for example unsaturated, alcohols. It is also possible to introduce highly concentrated formaldehyde condensation resins into dispersions having a high polymer moiety.

The application of the mixtures comprising amino plast resin solutions and polymer dispersions to the water absorbing carrier, for example a paper web, may be accomplished in any suitable manner dependent on the respective viscosity of the aqueous preparation.

If paper of exceptional absorption capacity is treated with the mixtures referred to, it may happen in some instances that the water soluble condensation resin penetrates predominantly into the paper so that gradually, upon repeated use of the bath, an enrichment of the dispersed phase in the mixture can be observed. This phenomenon can be prevented in different ways. Thus, by increasing the viscosity of the aqueous phase, a uniform impregnation may usually be obtained thereby avoiding the undesired predominant pentration of the condensation resin. Such increase of the viscosity of the aqueous phase can be obtained by using highly concentrated aqueous condensation resin solutions which are introduced into polymer dispersions having a high solid content. Further, it is, of course, possible to counteract the phenomenon referred to by adding the usual thickeners such as methyl cellulose, polyvinyl alcohol, polyacrylic compound, etc. Moreover, if carriers of lower absorption capacity, such as for example satin-like paper, are used, then the impregnation with the mixture of amino plastic resin solutions and the polymer dispersion can be readily controlled in the desired quantity ratio.

The invention will now be described by several examples, it being understood, however, that these examples are given by way of illustration and not by way of limitation and that many changes may be effected in raw materials, temperatures, quantities and process conditions in general without departing in any way from the scope and spirit of this invention as recited in the appended claims.

*Example I*

An aqueous dispersion of a partially or pre-polymerized diallyl phthalate was prepared as follows:

45 parts by weight of carbon tetrachloride were added to a solution containing 6 parts by weight of polyvinyl alcohol (the alcohol contained still 2 mole-percent of acetate groups) and 180 parts by weight of water. 300 parts by weight of diallyl phthalate were then added under stirring to the aqueous solution while the temperature was maintained at about 25° C. The diallyl phthalate contained dissolved therein 4.5 parts by weight of benzoyl peroxide. The emulsion thus obtained was heated in a nitrogen atmosphere under stirring for about 3½ hours, to 85 to 90° C. The course of the reaction was constantly observed with the refraction index as measure by determining the increasing refraction index in a sample from which the carbon tetrachloride and the water had been removed in vacuo. The polymerization was interrupted by cooling after the refraction index had reached a value of $n_{25}^D$ 1.55. Thereafter, the carbon tetrachloride was distilled off in vacuum at a bath temperature of 30° C. The dispersion obtained in this manner was very stable. The partially polymerized product obtained was soluble in acetone and had an iodine number of 62.5. Before impregnation of the carrier to be described hereinafter, 1% of tertiary butyl perbenzoate was added to the partially polymerized aqueous system.

The aqueous dispersion thus obtained was thereafter used for treating a carrier. The carrier in this Example was a soda cellulose paper of relatively high obsorption capacity having a weight of 150 g. per sq. meter. The paper was pigmented with iron oxide to a reddish-brown color. The paper in web form was passed through the aqueous preparation of diallyl phthalate obtained in accordance with the teachings of this Example. The concentration of the partially polymerized diallyl phthalate in the aqueous system was about 60%. Excess of dispersion was removed by a doctor blade or wiper whereafter the impregnated web was passed through a drying zone or chamber which was charged with hot air of 110° C. After drying, the web had a weight of 400 g. per sq. meter. The web can be used as a decorative foil. The foil for this purpose was placed on a fiber board, the surface characteristics of which were to be improved. The foil was bonded to the board at a temperature of 150° C. and at a pressure of 6 kg. per sq. cm. After pressing for 15 minutes, the fiber plate had an integrally bonded coat of strong smooth surface.

*Example II*

A dispersion of pre-polymerized diallyl phthalate was prepared as follows:

150 parts by weight of partially polymerized diallyl phthalate in solid form which had been prepared according to prior art methods and 15 parts of monomeric diallyl phthalate were dissolved in 120 parts of benzene. The benzene solution, under vigorous stirring, was added to 120 parts of an aqueous 3% solution of polyvinyl alcohol which contained still 12 mole-percent of acetyl groups. The benzene was thereafter distilled off in its entirety, if desired under reduced pressure. A stable dispersion was obtained in this manner. The dispersion flowed readily and could be easily applied by brushes or rollers.

The experiment was repeated and 20 parts of monomeric diallyl phthalate were emulsified with 150 parts of the dispersion thus obtained by adding the monomeric compound under stirring. This did not affect the stability of the dispersion.

The dispersion thus obtained was applied to a carrier. The carrier in this example consisted of a non-woven fiber fleece of synthetic material having a weight of 40 g. per sq. meter. The application and drying of the dispersion were accomplished in the same manner as described in connection with Example I. The concentration of diallyl phthalate in the aqueous dispersion was 55% and contained 5% of monomeric diallyl phthalate while 1% of tertiary butyl perbenzoate had been added prior to impregnation. A foil was obtained which had a weight of 80 g. per sq. meter. This foil was placed above a decorative foil obtained according to Example I, and the two superimposed foils were pressed onto a fiber plate under a pressure of 7 kg. per sq. meter and at a temperature of 150° C. After 15 minutes of pressing, a plate was obtained whose surface had an attractive top coat of high shine.

*Example III*

130 parts of a pre-polymerized diallyl phthalate in powder form as well as 15 parts of monomeric diallyl phthalate were dissolved in 150 parts of benzene and were added under vigorous stirring to 125 parts of a 2% aqueous solution of polyacrylic amide. The benzene was thereafter distilled off under reduced pressure while the emulsion was continuously agitated by a high speed stirrer. 20 parts of methyl methacrylate were introduced into the stable dispersion obtained whereby a paste-like dispersion was obtained which, by addition of 50 parts of water, again was brought into a thinly liquid form. The dispersion obtained in this manner was used for coating or impregnating webs in the manner described in Examples I and II.

*Example IV*

An aqueous dispersion of a pre-polymerized diallyl phthalate was obtained as follows:

A solution of 6 parts by weight of polyvinyl alcohol in 200 parts of water was prepared. The polyvinyl alcohol contained 12 mole-percent of acetate groups. The solution was maintained at 25° C. and 300 parts by weight of diallyl phthalate were added under stirring. 5 parts by weight of benzoyl peroxide were dissolved in the diallyl phthalate. The emulsion thus obtained was heated under stirring in a nitrogen atmosphere to about 89 to 90° C. Thereafter, 12 parts by weight of carbon tetrachloride were added within a period of 30 minutes. When a test sample from which the carbon tetrachloride and the water had been removed in vacuo showed a refraction index of 1.538, a further amount of 12 parts by weight of carbon tetrachloride was added in dropwise manner to the emulsion within a time period of 45 minutes. The polymerization was interrupted by cooling when a refraction index value of $n_{25}^D$ 1.553 had been reached. The carbon tetrachloride was distilled in vacuum at a bath temperature of 30° C. The iodine number of this partially or pre-polymerized product amounted to 60.2.

The aqueous dispersion thus obtained was used for the impregnation of a carrier which in this case was unglued highly bleached cotton linter paper having a weight of 40 g. per sq. meter. The cotton paper was devoid of any pigmentation. This paper was passed through the aqueous dispersion which had previously been admixed with 1% of tertiary butyl perbenzoate. The impregnation and drying were otherwise effected in the same manner as in the previous Example I. A foil was thus obtained having a weight of 85 g. per sq. meter which, upon bonding to a base under pressure, yielded a completely transparent coat so that the surface of the base proper could be readily seen.

*Example V*

An aqueous dispersion was prepared as follows:

15 parts by weight of benzoyl peroxide were added to 750 parts by weight of diallyl phthalate. The reaction mixture was heated in a nitrogen atmosphere under stirring to 90° C. 120 parts by weight of carbon tetrachloride were thereafter added in dropwise manner to the reaction mixture within a period of two hours. When a test sample devoid of carbon tetrachloride had reached a refraction index value of 1.538, an aqueous solution of 15 parts by weight of polyvinyl alcohol in 450 parts by weight of water was added to the reaction mixture. The polyvinyl alcohol contained 12% of acetate groups. The polymerization was then continued at the same temperature until a test sample devoid of water and carbon tetrachloride showed a refraction index of $n_{25}^D$ 1.552. The carbon tetrachloride was distilled in vacuum at a bath temperature of 30° C. The polymerization product was soluble in acetone, was entirely colorless, and had an iodine number of 68.2.

An aliquot portion of the dispersion was broken by the addition of a sodium chloride solution of 20% concentration. The precipitating polymerization product was taken up in equal parts of acetone and for recovery purposes stirred into five times the amount of methanol. The polymerisate obtained in this manner, upon drying, was a colorless powder, soluble in acetone, having an iodine number of 63 and a chlorine content of 5.8% by weight.

*Example VI*

A 60% dispersion of polydiallyl phthalate containing 2% of tertiary butyl perbenzoate was prepared. 30 parts of a 55% solution of a melamine formaldehyde resin was added to 120 parts of the dispersion. The melamine formaldehyde resin had been condensed in the usual manner in a weakly alkaline medium in a mole ratio of melamine to formaldehyde of 1:1.5. 0.4 part of methyl cellulose were added to the reaction mixture and a carrier paper having an absorption capacity height of 25 to 30 mm. per minute (measured in the longitudinal direction) and having a weight of 120 g. per sq. meter was passed through the reaction mixture. The carrier was an unglued alpha cellulose paper which had been colored by pigments. By passing the paper through squeezing rollers, the amount of preparation applied to the paper was adjusted so that after the drying of the paper in a hot air channel for 3 to 4 minutes at 105 to 110° C., a film with a weight of 250 g. per sq. meter was obtained.

The film was cured at 160° C. at a pressure of 12 kg. per sq. cm. and was thereafter tested for its water resistance. As compared to films prepared without melamine resin addition, the following results were obtained:

[Weight addition of the sample, consisting of four film layers with dimension 10 x 10 sq. cm., after two hours of treatment in boiling water]

| | | | |
|---|---|---|---|
| Without addition of melamine_____percent____ | 5.1 | 4.6 | 4.8 |
| With melamine addition_____do____ | 0.52 | 0.48 | 0.39 |

The pre-polymerized diallyl phthalate dispersion used in this example had been prepared as follows:

200 parts of a pre-polymerized diallyl phthalate in powder form which had been prepared by a prior art method and 18 parts of monomeric diallyl phthalate were dissolved in 200 parts of benzene and the solution thus obtained was added to an aqueous solution of 150 parts of water and 6 parts of polyvinyl alcohol. The solution was maintained at 85° C. and the addition was performed slowly and under stirring. During the addition of the benzene solution, the major portion of the solvent distilled over and a dispersion of paste-like consistency was obtained. By applying vacuum to the stirred reaction vessel, the last remnants of benzene were removed. The dispersion thus obtained was most stable and had a solid content of 70%. The dispersion was diluted with distilled water to a solid content of 60%.

*Example VII*

A carrier material consisting of pigmented unglued α-cellulose paper having an absorption height of 50 mm. per 10 minutes (measured in the longitudinal direction) and having a weight of 150 g. per sq. meter was coated with a mixture of the nature to be defined hereinafter in such an amount that after a drying period of 4 minutes in a heating chamber at a temperature of 108° C. it had a weight of 350 g. per sq. meter.

The mixture applied to the carrier contained 45 parts of an aqueous solution of a melamine resin and 55 parts of a 60% uncured polydiallyl phthalate dispersion of the kind described in connection with Example I. The dispersion was admixed with 2% of tertiary butyl perbenzoate and 0.2% by weight of methyl cellulose. The melamine resin had been condensed in the usual manner in a mole ratio of melamine to formaldehyde of 1:2 up to the formation of the corresponding methylol compound. Subsequently, and at an acid pH value, it has been etherified in the usual manner with an excess amount of allyl alcohol and under removal of water to such an extent that about half the amount of the methylol groups were retained.

The weight addition of the test sample consisting of 4 film layers of the dimension 10 x 40 cm. after 2 hours of treatment in boiling water gave the following values:

[Weight addition]

| | | | |
|---|---|---|---|
| Without addition of melamine resin_____ | 5.0 | 4.7 | 3.8 |
| With melamine addition_____ | 0.35 | 0.40 | 0.38 |

What is claimed is:

A process of producing laminar products suitable as surface coatings, which comprises emulsifying in water monomeric diallyl phthalate, partially polymerizing a portion of the monomeric diallyl phthalate in the presence of about 1–30% by weight of carbon tetrachloride calculated on the amount of diallylphthalate and at a temperature of about between 60–120° C. to obtain an aqueous dispersion of monomeric diallyl phthalate and partially polymerized diallyl phthalate, interrupting the polymerization when a refraction index of not more than about $n_{25}^D$ 1.55 has been reached, applying said aqueous dispersion to a carrier web and removing the water from the web by heat drying.

References Cited in the file of this patent

UNITED STATES PATENTS

| | | |
|---|---|---|
| 2,320,536 | Pollack et al. | June 1, 1943 |
| 2,575,553 | Kolvoort | Nov. 20, 1951 |
| 2,809,911 | Richardson | Oct. 15, 1957 |